US010373041B1

(12) United States Patent
Benkreira et al.

(10) Patent No.: US 10,373,041 B1
(45) Date of Patent: Aug. 6, 2019

(54) PAYMENT CARD AND METHOD OF MANUFACTURING THE SAME

(71) Applicant: Capital One Services, LLC, McLean, VA (US)

(72) Inventors: Abdelkader Benkreira, Washington, DC (US); Michael Mossoba, Arlington, VA (US); Joshua Edwards, Philadelphia, PA (US)

(73) Assignee: Capital One Services, LLC, MCLean, VA (US)

( * ) Notice: Subject to any disclaimer, the term of this patent is extended or adjusted under 35 U.S.C. 154(b) by 0 days.

(21) Appl. No.: 16/034,810

(22) Filed: Jul. 13, 2018

(51) Int. Cl.
*G06K 19/06* (2006.01)
*G06K 19/077* (2006.01)

(52) U.S. Cl.
CPC . *G06K 19/07722* (2013.01); *G06K 19/06196* (2013.01)

(58) Field of Classification Search
CPC ............. G06K 19/00; G06K 19/06046; G06K 19/067; G06K 19/07
USPC .................................................. 235/492, 487
See application file for complete search history.

(56) References Cited

U.S. PATENT DOCUMENTS

| 5,411,295 A | 5/1995 | Bates et al. |
| 2005/0260386 A1* | 11/2005 | Heinrich ........... B29C 45/14811 428/141 |
| 2017/0150626 A1* | 5/2017 | Kim ................... G02F 1/133308 |

FOREIGN PATENT DOCUMENTS

EP         1359549       * 8/2002

* cited by examiner

*Primary Examiner* — Daniel St Cyr
(74) *Attorney, Agent, or Firm* — DLA Piper LLP US

(57) ABSTRACT

Embodiments disclosed herein generally relates to a payment card, and more specifically to a payment card with obfuscated personal identification information and a method of generating the same. In one embodiment, an apparatus is disclosed herein. The apparatus includes a substrate, one or more sets of personal identification information, and a masking layer. The substrate is formed from a water-insoluble material. The one or more sets of personal identification information is formed on the substrate. The masking layer is selectively positioned on the substrate to obscure at least one set of personal identification information. The masking layer is formed from a water-soluble material.

19 Claims, 3 Drawing Sheets

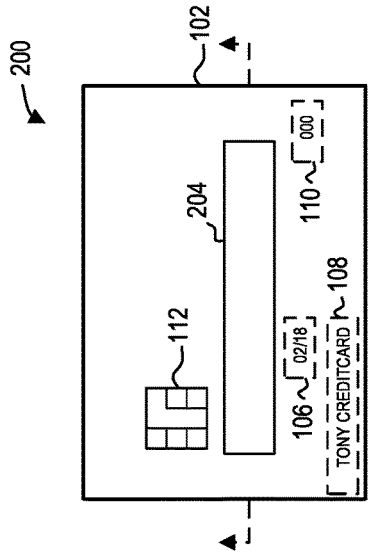  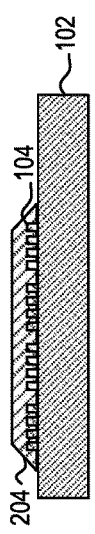
FIG. 1A  FIG. 1B
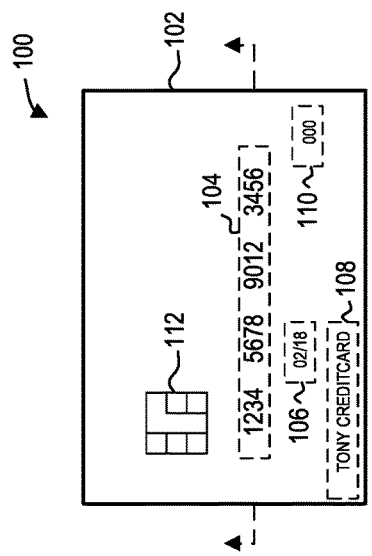 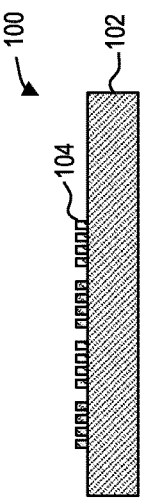
FIG. 2A  FIG. 2B  FIG. 2C

PAYMENT CARD AND METHOD OF MANUFACTURING THE SAME

FIELD OF THE DISCLOSURE

The present disclosure generally relates to a payment card, and more specifically to a payment card with obfuscated personal identification information and a method of generating the same.

BACKGROUND

Transaction cards, such as credit and debit cards, have increasingly become a primary means for customers to complete financial transactions. Typically, transaction cards are cut from laminated sheets of polyvinyl chloride (PVC) or polycarbonate (PC), or other similar materials. After the overall shape of the card is formed, the card may be modified to add functional and/or visual features. For example, a magnetic strip may be affixed to one side, the card may be stamped with the card number and customer name, and color or a design may be added for appearance.

SUMMARY

Embodiments disclosed herein generally relates to a payment card, and more specifically to a payment card with obfuscated personal identification information and a method of generating the same. In one embodiment, an apparatus is disclosed herein. The apparatus includes a substrate, one or more sets of personal identification information, and a masking layer. The substrate is formed from a water-insoluble material. The one or more sets of personal identification information is formed on the substrate. The masking layer is selectively positioned on the substrate to obscure at least one set of personal identification information. The masking layer is formed from a water-soluble material.

In some embodiments, the one or more sets of personal identification information are embossed on a top surface of the substrate.

In some embodiments, a top surface of each set of personal identification information is raised above the top surface of the substrate.

In some embodiments, each character in each set of personal identification information includes a character top surface, a character bottom surface, and a character side surface. The character bottom surface is opposite the character top surface. The character bottom surface interfaces with the top surface of the substrate. The character side surface extends from the character top surface to the character bottom surface.

In some embodiments, the masking layer is selectively positioned on the substrate such that the masking layer contacts the character top surface and the character side surface of each character in at least one set of personal identification information.

In some embodiments, the masking layer completely covers the character top surface and the character side surface of each character in at least one set of personal identification information.

In some embodiments, the apparatus further includes an integrated circuit embedded in the substrate.

In some embodiments, the apparatus further includes a second masking layer selectively positioned on the substrate to obscure the integrated circuit. The second making layer is formed from a water-soluble material.

In some embodiments, the masking layer is selectively positioned on the one or more sets of personal identification information and the integrated circuit.

In another embodiment, an apparatus is disclosed herein. The apparatus includes a substrate, a first set of personal identification information, a second set of personal identification information, a first masking layer, and a second masking layer. The substrate is formed from a water-insoluble material. The substrate includes a top surface and a bottom surface opposite the top surface. The first set of personal identification information is formed on the top surface of the substrate. The second set of personal identification information formed on the bottom surface of the substrate. The first masking layer is selectively positioned on the top surface of the substrate to obscure the first set of personal identification information. The first masking layer is formed from a water-soluble material. The second masking layer is selectively positioned on the bottom surface of the substrate to obscure the second set of personal identification information. The second masking layer is formed from a water-soluble material.

In some embodiments, at least one of the first set of personal identification information and the second set of personal identification information are embossed on the substrate.

In some embodiments, a top surface of each set of personal identification information is raised above the top surface of the substrate.

In some embodiments, each character in each set of personal identification information includes a character top surface, a character bottom surface, and a character side surface. The character bottom surface is opposite the character top surface. The character bottom surface interfaces with the top surface of the substrate. The character side surface extends from the character top surface to the character bottom surface.

In some embodiments, the first masking layer is selectively positioned on the substrate such that the first masking layer contacts the character top surface and the character side surface of each character in the first set of personal identification information.

In some embodiments, the second masking layer is selectively positioned on the substrate such that the second masking layer contacts the character top surface and the character side surface of each character in the second set of personal identification information.

In some embodiments, the apparatus further includes an integrated circuit embedded on the top surface of the substrate.

In some embodiments, the apparatus further includes a third masking layer selectively positioned on the substrate to obscure the integrated circuit. The third making layer is formed from a water-soluble material.

In some embodiments, the apparatus further includes a third masking layer selectively positioned on the substrate to obscure the integrated circuit, the third masking layer formed from a waterproof material.

In another embodiment, a method of manufacturing a payment card is disclosed herein. The method includes receiving a substrate formed from a water-insoluble material. The method further includes embossing at least one set of personal identification information on the substrate. The method further includes depositing a masking layer on the substrate to obscure the at least one set of personal identification information. The masking layer is formed from a water-soluble material.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 1A is a schematic view of a payment card, according to one exemplary embodiment.

FIG. 1B is a cross-sectional view of the payment card of FIG. 1A, according to one exemplary embodiment.

FIG. 2A is a schematic view of a payment card, according to one exemplary embodiment.

FIG. 2B is a cross-sectional view of the payment card of FIG. 2A, according to one exemplary embodiment.

FIG. 2C is a cross-sectional view of the payment card of FIG. 2A, according to one exemplary embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 5A:
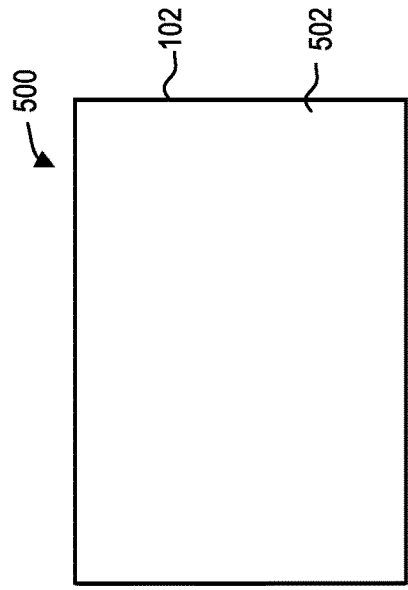
FIG. 5A is a schematic view of a payment card, according to one exemplary embodiment.

The present disclosure generally relates an improvement payment card that obfuscates personal identification information included thereon. For example, the one or more techniques disclosed herein rely on a water-soluble masking layer selectively deposited on a water-insoluble substrate. The water-soluble masking layer may be selectively deposited over personal identification information (e.g., payment card number, cardholder's name, expiration date, card security code, etc.) to obfuscate (or mask) the personal identification information. To remove the masking layer, the payment card may be submerged (or immersed) in water until the water-soluble masking layers have dissolved.

FIG. 1A is a schematic view of a payment card 100, according to one exemplary embodiment. Payment card 100 may include at least a substrate 102 and one or more sets of personal identification information (e.g., 104-112). Substrate 102 may be formed from a water-insoluble material. Such suitable water-insoluble materials may include at least plastic, metal, polyvinyl chloride (PVC), or polycarbonate (PC). Printed on substrate 102 may be one or more sets of personal identification information. In some embodiments, one or more sets of personal identification information may be embossed on the substrate. As illustrated, payment card 100 includes personal identification information 104-112.

Personal identification information 104 may correspond to a payment card number. Payment card number may be used to uniquely identify payment card 100 during transactions. In some embodiments, payment card number may be linked to an underlying bank account associated with the user of payment card 100. In some embodiments, payment card number may be used to uniquely identify a bank that issued payment card 100. In some embodiments, payment card number may also be used to identify a debit account with a financial institution.

Personal identification information 106 may correspond to an expiration date of payment card 100. Expiration date may be a pre-set date upon which payment card 100 will no longer be valid. Expiration date may be further used to authenticate a transaction using payment card 100. For example, in order to perform an online transaction (e.g., a card-not-present transaction), expiration date may be used to further verify user's possession of payment card 100.

Personal identification information 108 may correspond to a cardholder's (i.e., user's) name. The cardholder's name may represent a specific representation of the user's name that may be used to further authenticate a transaction using payment card 100. For example, in order to perform an online transaction, a user may be prompted to enter the cardholder's name, as printed on payment card 100. Accordingly, if the cardholder's name includes a middle initial, for example, the user must necessarily enter the middle initial when prompted to enter the cardholder's name.

Personal identification information 110 may correspond to a card security code (e.g., card verification value (CVV), card verification code (CVC), and the like). Card security code may be a pre-set number of digits that are used to further authenticate a transaction using payment card 100. For example, in order to perform an online transaction (e.g., a card-not-present transaction), card security code may be used to further verify user's possession of payment card 100.

In some embodiments, payment card 100 may further include an integrated circuit 112 contained therein. For example, in some embodiments, payment card 100 may be a EuroPay-MasterCard-Visa ("EMV™") card that includes integrated circuit 112, or a secure payment chip, which may be an EMV™ chip. In operation, integrated circuit 112 may communicate with terminals to conduct secure transactions. Integrated circuit 112 may dynamically store data that was previously stored on payment card's 100 magnetic stripe (not shown), allowing for increased security.

Further, although not shown, those skilled in the art may readily understand that payment card 100 may include a magnetic strip on a backside thereof. Still further, although all of personal identification information 104-110 are shown positioned on a first surface of substrate 102, those skilled in the art may readily understand that one or more sets of personal identification information 104-110 may be positioned (or embossed) on a second surface of substrate 102.

FIG. 1B is a cross-sectional side view of payment card 100, according to one embodiment. As shown, personal identification information 104 may be embossed on a top surface of substrate 102. As such, personal identification information 104 may include a top surface that is raised above the top surface of substrate 102.

When a bank or financial institution issues a payment card (e.g., payment card 100) to user, the bank or financial institution may typically mail the payment card to the user. Such process may pose several security risks, the most prevalent of which is a third-party intercepting the payment card in the mail and using the payment card to conduct a transaction. Third parties may intercept the payment card by physically removing the payment card from the envelope (for example), or may access the personal identification information printed on the payment card without tampering with the envelope. To address these security risks, financial institutions have typically obfuscated the personal identification information printed on the card with stickers, or labels. Such methodology presents several shortcomings.

First, should a third party gain access to the payment card through the envelope, if there is no proof of envelope tampering, a user would not know whether the payment card is compromised. A third party may remove the sticker to copy the personal identification information and simply replace the sticker and repackage the payment card. Second, should a third party not gain access to the payment card by opening the envelope, a user may be able to deduce the personal identification information through the sticker. Because personal identification information may be raised from a top surface of the payment card (or substrate), a third party may be able to decipher each character through feeling each character or shading the personal identification number through a piece of paper.

The present disclosure addresses these shortcomings through an improved means of obfuscating personal identification information printed on a payment card. FIG. 2A is a schematic view of a payment card 200, according to one exemplary embodiment. Payment card 200 is substantially similar to payment card 100. For example, payment card 200 may include substrate 102, personal identification information 104-110, and integrated circuit 112. Payment card 200 may further include a masking layer 204 selectively deposited thereon. Masking layer 204 may be formed from a water-soluble material. Exemplary water-soluble materials may include, for example, polyvinyl alcohol (PVA) commercially available from Ultimaker, HydroFill Water Soluble Support Material commercially available from Airwolf3D®, Water Soluble Filament commercially available from XYZprinting, and the like. To remove masking layer 204, user may submerge payment card 200 in water, such that masking layer 204 is dissolved. Alternatively, a user may pour or otherwise apply water, or another liquid, to the masking layer 204 until it is dissolved.

In some embodiments, masking layer 204 may be formed from an opaque material. In some embodiments, masking layer 204 may be formed from a material of a color that is similar to the color of personal identification information 104-110 included thereon. In some embodiments, masking layer 204 may be formed a pre-defined thickness above personal identification information 104-110, such that a bright light shined thereon will not expose the information therein.

In operation, masking layer 204 may be selectively deposited on substrate 102 to mask (or "obfuscate") one or more sets of personal identification information. In some embodiments, masking layer 204 may be three-dimensionally printed on substrate 102. As illustrated, masking layer 204 may be deposited over personal identification information 104 (i.e., the card number). The existence of masking layer 204 upon receipt of payment card 200 by the user ensures that the personal identification information that is obfuscated was not made available to a third party. In particular, because masking layer 204 may be removed through exposure to water, should a third-party intercept payment card 200 and remove masking layer 204, the third party would not be able to re-attach masking layer 204 similar to conventional means of obfuscating personal identification information. Further, when the user receives payment card 200, masking layer 204 would be removed, signaling to the user that payment card 200 was compromised. Further, in those situations when a fraudulent user removes masking layer 204 with a tool (e.g., knife, chisel, hammer, etc.), remaining debris on payment card 200 may also signal to the user that payment card 200 was compromised.

FIG. 2B illustrates a cross-sectional side view of payment card 200, according to one embodiment. As shown, masking layer 204 can be deposited on substrate 102. Masking layer 204 may be deposited such that masking layer 204 completely surrounds each character in a specific set of personal identification information. For example, in FIG. 2B, masking layer 204 may be deposited such that each character (i.e. digit) in the card number is substantially surrounded by masking layer 204. In some embodiments, each character in the card may be completely surrounded by masking layer 204. As such, masking layer 204 contacts a top surface and side surface of each character. Further, masking layer 204 may be deposited such that masking layer fills each gap between characters, i.e., masking layer 204 also contacts the top surface of substrate 102 between characters. As such, through this deposition process, a third party would be unable to decipher characters through masking layer 204.

FIG. 2C illustrates a cross-sectional side view of payment card 200, according to one embodiment. As shown, masking layer 204 may be angled or sloped from a top of the layer to the top surface of payment card 200.

Figure 3:
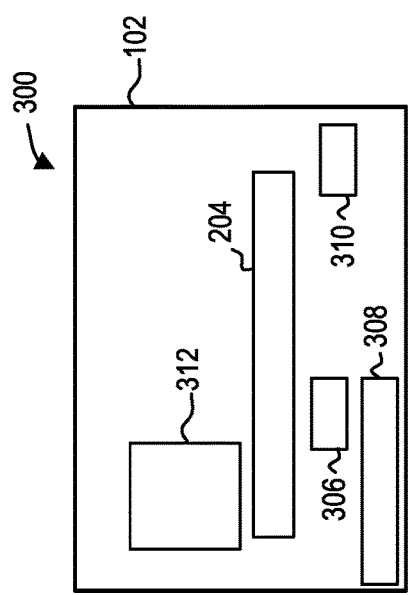
FIG. 3 is a schematic view of a payment card, according to one exemplary embodiment.

FIG. 3 is a schematic view of a payment card 300, according to one exemplary embodiment. Payment card 300 may be substantially similar to payment card 200 and payment card 100. In particular, payment card 300 may include substrate 102 and masking layer 204. Further, payment card 300 may include masking layer 306, masking layer 308, and masking layer 310. Masking layer 306 may be selectively deposited over personal identification information 106 (i.e., expiration date). Masking layer 308 may be selectively deposited over personal identification information 108 (i.e., cardholder's name). Masking layer 310 may be selectively deposited over personal identification information 310 (i.e., credit security code). Each of masking layer 306-310 may be formed from a water-soluble material, similar to masking layer 204.

In some embodiments, payment card 300 may further include masking layer 312. Masking layer 312 may be selectively deposited on integrated circuit 112. In some embodiments, masking layer 312 may be formed of a water-soluble material similar to masking layer 204 and masking layers 306-312. In some embodiments, masking layer 312 may be a waterproof layer configured to protect integrated circuit 112 from exposure to liquids. For example, masking layer 312 may be a sticker-like layer positioned over integrated circuit 112. Masking layer 312 may be positioned over integrated circuit 112 using a pressure-sensitive adhesive.

Figure 4:
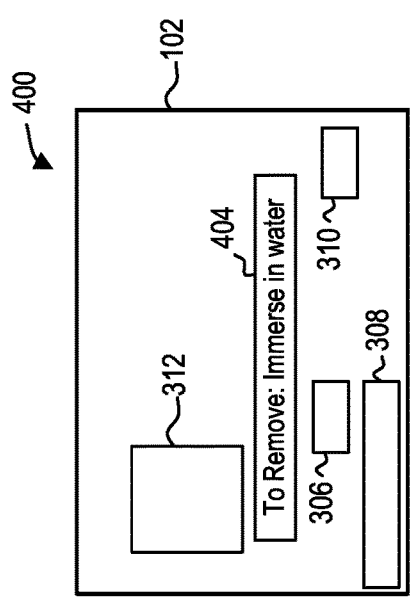
FIG. 4 is a schematic view of a payment card, according to one exemplary embodiment.

FIG. 4 is a schematic view of a payment card 400, according to one exemplary embodiment. Payment card 400 may be substantially similar to payment card 300, payment card 200, and payment card 100. In particular, payment card 400 may include substrate 102 and masking layers 306-312. Payment card 400 may further include masking layer 404. Masking layer 404 is substantially similar to masking layer 204. For example, masking layer 404 may be deposited over personal identification information 104, and may be formed from a water-soluble material. Masking layer 404 may further include a message printed thereon. The message may include, for example, directions for removal of at least masking layer 404. The message may be screen-printed on masking layer 404. As illustrated, the message may recite "To Remove: Immerse in Water."

Figure 5B:
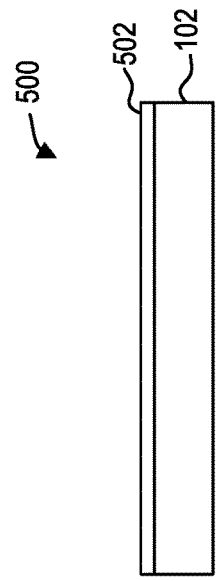
FIG. 5B is a side schematic view of a payment card, according to one exemplary embodiment.

FIG. 5A is a schematic view of a payment card 500, according to one exemplary embodiment. FIG. 5B is a side view of payment card 500, according to one exemplary embodiment. Payment card 500 may be substantially similar to payment card 400, payment card 300, payment card 200, and payment card 100. In particular, payment card 500 may include substrate 102. Further, although not visible, payment card 500 may include personal identification information 104-110 and integrated circuit 112. Payment card 500 may further include masking layer 502. Masking layer 502 may be substantially similar to masking layer 204. Masking layer 502 may be formed from a water-soluble material. Masking layer 502 may be uniformly (or near uniformly) deposited on a top surface of substrate 102. Accordingly, masking layer 502 may completely cover the top surface of substrate 102. In some embodiments, sticker 312 may be positioned under masking layer 502.

Although the above discussion discussed payment cards in conjunction with personal identification information contained on a first surface (e.g., top surface) of substrate 102, those skilled in the art may readily understand that personal identification information may also be contained on a second surface (e.g., back surface) of substrate 102, as well. In those situations, masking layers may be selectively deposited on both the first surface and the second surface of substrate 102.

Figure 6:
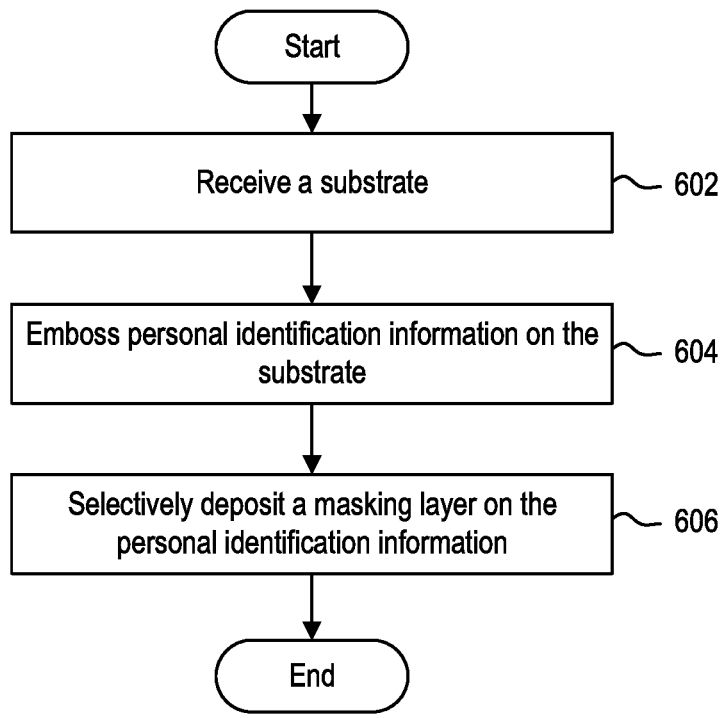
FIG. 6 is a block diagram illustrating a method of generating a payment card, according to one embodiment.

FIG. 6 is a flow diagram illustrating a method 600 of manufacturing a payment card (e.g., payment card 100, payment card 200, payment card 300, payment card 400, and payment card 500) according to one exemplary embodiment. Method 600 begins at step 602. At step 602, a processing system receives a substrate (e.g., substrate 102. The substrate may be formed from a water-insoluble material. Such materials may include, for example, plastic and metal.

At step 604, the processing system may emboss personal identification information on the substrate. In some embodiments, the processing system may emboss one or more sets of personal identification information on a top surface of the substrate. In some embodiments, the processing system may emboss one or more sets of personal identification information on a bottom surface of the substrate. Personal identification information may include, for example, a payment card number, a cardholder's name, an expiration date, a card security code, and the like.

At step 606, the processing system may selectively deposit a masking layer on the personal identification information. The masking layer may be formed from a water-soluble material. Such materials may include, for example, polyvinyl alcohol. In some embodiments, a masking layer may be deposited over each set of personal identification information embossed on the substrate. In some embodiments, a masking layer may be uniformly (or near uniformly) deposited on a surface of the substrate, thus obfuscating all sets of personal identification information.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. An apparatus, comprising:
   a substrate formed from a water-insoluble material;
   one or more sets of personal identification information formed on the substrate, wherein the one or more sets of personal identification information comprises a plurality of characters; and
   a masking layer selectively positioned on the substrate to obscure at least one set of personal identification information, the masking layer formed from a water-soluble material, wherein the masking layer is selectively positioned on the substrate such that the masking layer contacts the substrate and envelops each character in at least one set of personal identification information.

2. The apparatus of claim 1, wherein the one or more sets of personal identification information are embossed on a top surface of the substrate.

3. The apparatus of claim 2, wherein a top surface of each set of personal identification information is raised above the top surface of the substrate.

4. The apparatus of claim 3, wherein each character in each set of personal identification information comprises:
   a character top surface;
   a character bottom surface opposite the character top surface, the character bottom surface interfacing with the top surface of the substrate; and
   a character side surface extending from the character top surface to the character bottom surface.

5. The apparatus of claim 4, wherein the masking layer completely covers the character top surface and the character side surface of each character in at least one set of personal identification information.

6. The apparatus of claim 1, further comprising:
   an integrated circuit embedded in the substrate.

7. The apparatus of claim 6, further comprising:
   a second masking layer selectively positioned on the substrate to obscure the integrated circuit, the second masking layer formed from a water-soluble material.

8. The apparatus of claim 6, further comprising:
   a second masking layer selectively positioned on the substrate to obscure the integrated circuit, the second masking layer formed from a waterproof material.

9. The apparatus of claim 6, wherein the masking layer is selectively positioned on the one or more sets of personal identification information and the integrated circuit.

10. An apparatus, comprising:
    a substrate formed from a water-insoluble material, the substrate comprising a top surface and a bottom surface opposite the top surface;

a first set of personal identification information formed on the top surface of the substrate, wherein the first set of personal identification information comprises a first plurality of characters;

a second set of personal identification information formed on the bottom surface of the substrate, wherein the second set of personal identification information comprises a second plurality of characters; and a first masking layer selectively positioned on the top surface of the substrate to obscure the first set of personal identification information, the first masking layer formed from a water-soluble material, wherein the first masking layer is selectively positioned on the substrate such that the first masking layer contacts the top surface of the substrate and envelops each character in the first plurality of characters; and a second masking layer selectively positioned on the bottom surface of the substrate to obscure the second set of personal identification information, the second masking layer formed from a water-soluble material, wherein the second masking layer is selectively positioned on the substrate such that the second masking layer contacts the bottom surface of the substrate and envelops each character in the second plurality of characters.

11. The apparatus of claim 10, wherein at least one of the first set of personal identification information and the second set of personal identification information are embossed on the substrate.

12. The apparatus of claim 11, wherein a top surface of each set of personal identification information is raised above the top surface of the substrate.

13. The apparatus of claim 12, wherein each character in each set of personal identification information comprises:
a character top surface;
a character bottom surface opposite the character top surface, the character bottom surface interfacing with the top surface of the substrate; and
a character side surface extending from the character top surface to the character bottom surface.

14. The apparatus of claim 13, wherein the first masking layer is selectively positioned on the substrate such that the first masking layer contacts the character top surface and the character side surface of each character in the first set of personal identification information.

15. The apparatus of claim 13, wherein the second masking layer is selectively positioned on the substrate such that the second masking layer contacts the character top surface and the character side surface of each character in the second set of personal identification information.

16. The apparatus of claim 10, further comprising:
an integrated circuit embedded on the top surface of the substrate.

17. The apparatus of claim 16, further comprising:
a third masking layer selectively positioned on the substrate to obscure the integrated circuit, the third making layer formed from a water-soluble material.

18. The apparatus of claim 16, further comprising:
a third masking layer selectively positioned on the substrate to obscure the integrated circuit, the third masking layer formed from a waterproof material.

19. A method of manufacturing a bank-issued device, comprising:
receiving a substrate formed from a water-insoluble material;
embossing at least one set of personal identification information on the substrate, wherein the at least one set of personal identification information comprises a plurality of characters; and
depositing a masking layer on the substrate to obscure the at least one set of personal identification information, the masking layer formed from a water-soluble material, the masking layer selectively deposited on the substrate such that the masking layer contacts the substrate and envelops each character in at least one set of personal identification information.

* * * * *